United States Patent [19]

Boser et al.

[11] 4,249,819

[45] Feb. 10, 1981

[54] ARRANGEMENT FOR FEEDING SHEETS INTO A DEVELOPING MACHINE

[75] Inventors: Heinz Boser; Nikolaus Jelinek, both of Munich, Fed. Rep. of Germany

[73] Assignee: AGFA-Gevaert, A.G., Leverkusen, Fed. Rep. of Germany

[21] Appl. No.: 83,631

[22] Filed: Oct. 11, 1979

[30] Foreign Application Priority Data

Oct. 17, 1978 [DE] Fed. Rep. of Germany ....... 2845077

[51] Int. Cl.[3] ...................... G03B 41/18; G01N 23/04

[52] U.S. Cl. .................................... 354/312; 250/468; 250/477; 271/147

[58] Field of Search ............... 354/307, 310, 311, 312, 354/315, 319, 277, 304, 332, 281, 283, 284, 297; 250/468, 477; 214/304; 271/145, 147

[56] References Cited

U.S. PATENT DOCUMENTS

| | | | |
|---|---|---|---|
| 3,418,913 | 12/1968 | Snarr | 250/468 |
| 3,652,853 | 3/1972 | Williner et al. | 250/468 |
| 3,720,408 | 3/1973 | Horn | 354/319 |
| 3,784,834 | 1/1974 | Berger | 250/477 |
| 3,828,195 | 8/1974 | Snarr | 250/468 |
| 4,160,912 | 7/1979 | Hogan | 250/468 |

FOREIGN PATENT DOCUMENTS

| | | | |
|---|---|---|---|
| 2403469 | 9/1974 | Fed. Rep. of Germany | 354/297 |

*Primary Examiner*—L. T. Hix
*Assistant Examiner*—Alan Mathews
*Attorney, Agent, or Firm*—Peter K. Kontler

[57] ABSTRACT

An arrangement for presenting light-sensitive sheets, especially X-ray film sheets, to a treating machine, especially to a developing machine, includes a closure which is mounted at an inlet opening of a withdrawing station of the machine for movement between a retracted position in which it is spaced from the inlet opening, and an extended position in which it light-tightly closes the inlet opening. The cassette containing the sheets to be withdrawn at the withdrawing station is mounted on a carriage for joint movement through the inlet opening and forms a movable unit therewith. An engaging member engages the movable unit and causes the closure to move into its extended position during the movement of the unit in an initial path section, while an unlatching device unlatches the lid of the cassette during the movement of the unit in an intermediate path section, and a lid-opening device opens the lid of the cassette during the movement of the unit in path terminal path section. A blocking device retains the lid during the return movement of the unit so that the lid is closed and latched before the closure is displaced into its retracted position. The carriage has a sealing plate which prevents manual displacement of the closure into the retracted position.

15 Claims, 2 Drawing Figures

ARRANGEMENT FOR FEEDING SHEETS INTO A DEVELOPING MACHINE

BACKGROUND OF THE INVENTION

The present invention relates to an arrangement for presenting sheets of light-sensitive material to a treating device in general, and more particularly to an arrangement for feeding sheets of light-sensitive material which are accommodated in light-tight containers with movable lids into a developing machine.

Arrangements of this general type are already known and used for removing sheets of exposed photographic material, such as sheets of X-ray film, from cassettes. Usually, these arrangements include a mechanism for unlatching the lid of the cassette, and withdrawing means which engages the individual sheets and withdraws them from the respective cassette after the latter has been opened.

Nowadays, there are being used X-ray film developing machines which are capable of treating films which are accommodated as a stack in the respective cassette. It has been already proposed, in the German published application DE-OS No. 2,403,469, to withdraw the individual film sheets by a suction-type sheet-lifting device from the cassette, and to transfer the individual sheets to a transporting roller pair of the developing machine. In order to be able to conduct this withdrawal even in a well-lit room, it is further known to use a shiftable curtain or a similar closure which is arranged in front of an inlet opening of the developing machine that is light-tight except for the inlet opening, and to move the curtain in front of the inlet opening after the introduction of the cassette into the withdrawing station of the developing machine. It is also already known to use a plate-shaped closure instead of the curtain for the above-mentioned purpose. However, in the known arrangements, there exists the danger that the curtain or the plate-shaped closure could be opened while the opened cassette with the sheet-shaped films is in the withdrawing station, or that the curtain or plate-shaped closure could only incompletely close the inlet opening, due to lack of caution on the part of the operating personnel. In both instances, ambient light would penetrate into the withdrawing station and damage if not completely destroy the image on the light-sensitive sheet.

OBJECTS AND SUMMARY OF THE INVENTION

Accordingly, it is a general object of the present invention to avoid the disadvantages of the prior art.

More particularly, it is an object of the present invention to provide a sheet-feeding arrangement for a developing machine which is not possessed of the disadvantages of the prior-art arrangements of this type.

Still another object of the present invention is to so construct the arrangement of the type here under consideration that it will invariably avoid penetration of ambient light into the withdrawing station of the developing machine while the cassette accommodating the light-sensitive sheet material is open.

A concomitant object of the present invention is to so design the sheet-presenting arrangement of the present invention as to be simple in construction, inexpensive to manufacture, easy to operate, and reliable nevertheless.

In pursuance of these objects and others which will become apparent hereafter, one feature of the present invention resides in an arrangement for presenting sheets of light-sensitive material which are accommodated in light-tight containers having lids movable between closed and opened positions, to a sheet-treating device having an inlet opening, particularly to a developing machine, which arrangement, briefly stated, comprises a closure mounted on the treating device for displacement between an extended position in which it light-tightly closes the inlet opening and a retracted position in which it is removed from the latter; means for displacing the closure from the retracted into the extended position in response to movement of a respective container in one direction through the inlet opening into the sheet-treating device in an initial path section; and means for moving the lid of the container into the open position in response to further movement of the container in the one direction in a terminal path section. When the arrangement of the present invention is used in connection with containers the lids of which are latched in their closed positions, there is further provided means for unlatching the lid of the respective container in response to movement of the latter in the one direction in an intermediate path section which is situated between the initial and the terminal path sections.

By resorting to the present invention, it is achieved that the unlatching and opening means for the container or cassette can become active only after the inlet opening to which the container or cassette was introduced into the interior of the sheet-treating device has been light-tightly closed. This is achieved by so arranging the displacing, unlatching and moving means relative to one another that the moving means is activated only after the displacing means has displaced the closure into the extended position. A particularly simple and advantageous construction is obtained when the displacing, moving and unlatching means are mounted in the interior of the device for a shared pivoting with a common shaft.

It is further advantageous when the arrangement further includes means for returning the lid into its closed position during the movement of the container opposite to the one direction prior to reaching the initial path section. In this manner, it is achieved that, should the cassette be moved in the direction from the interior of the sheet-treating device or developing machine toward the inlet opening before all of the light-sensitive sheets accommodated in the container have been withdrawn therefrom, the lid of the cassette is closed before the closure lets any ambient light penetrate into the interior of the treating station through the inlet opening. In this manner, it is assured that no light can reach the sheet or sheets remaining in the container during such premature removal of the cassette from the withdrawing station, because the lid reaches its closed position before the closure starts moving towards its retracted position.

Despite the multitude of functions performed by the arrangement of the present invention, the inroduction of the container or cassette into, and its subsequent removal from, the withdrawing station through the inlet opening is simple and reliable. A further advantage of the arrangement of the present invention is that it can be accommodated to different cassete dimensions and systems by a simple readjustment or repositioning of the individual means.

In accordance with a currently preferred embodiment of the present invention, the respective container is supported for movement into the device through the inlet opening on a carriage with which it forms a movable unit. Then, it is particularly advantageous when the carriage includes a sealing plate which is mounted on that end portion of the carriage which extends to the exterior of the device, and which covers the closure and the inlet opening when the container reaches the terminal and of the terminal path section. In this manner, it is assured that the operating personnel cannot manually displace the closure into its retracted position when the cassette is situated in the withdrawing station and its lid is open, so that an otherwise occurring impingement of light on the sheets contained in the cassette is avoided.

The novel features which are considered as characteristic of the invention are set forth in particular in the appended claims. The improved arrangement for feeding X-ray films from cassettes into a developing machine itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
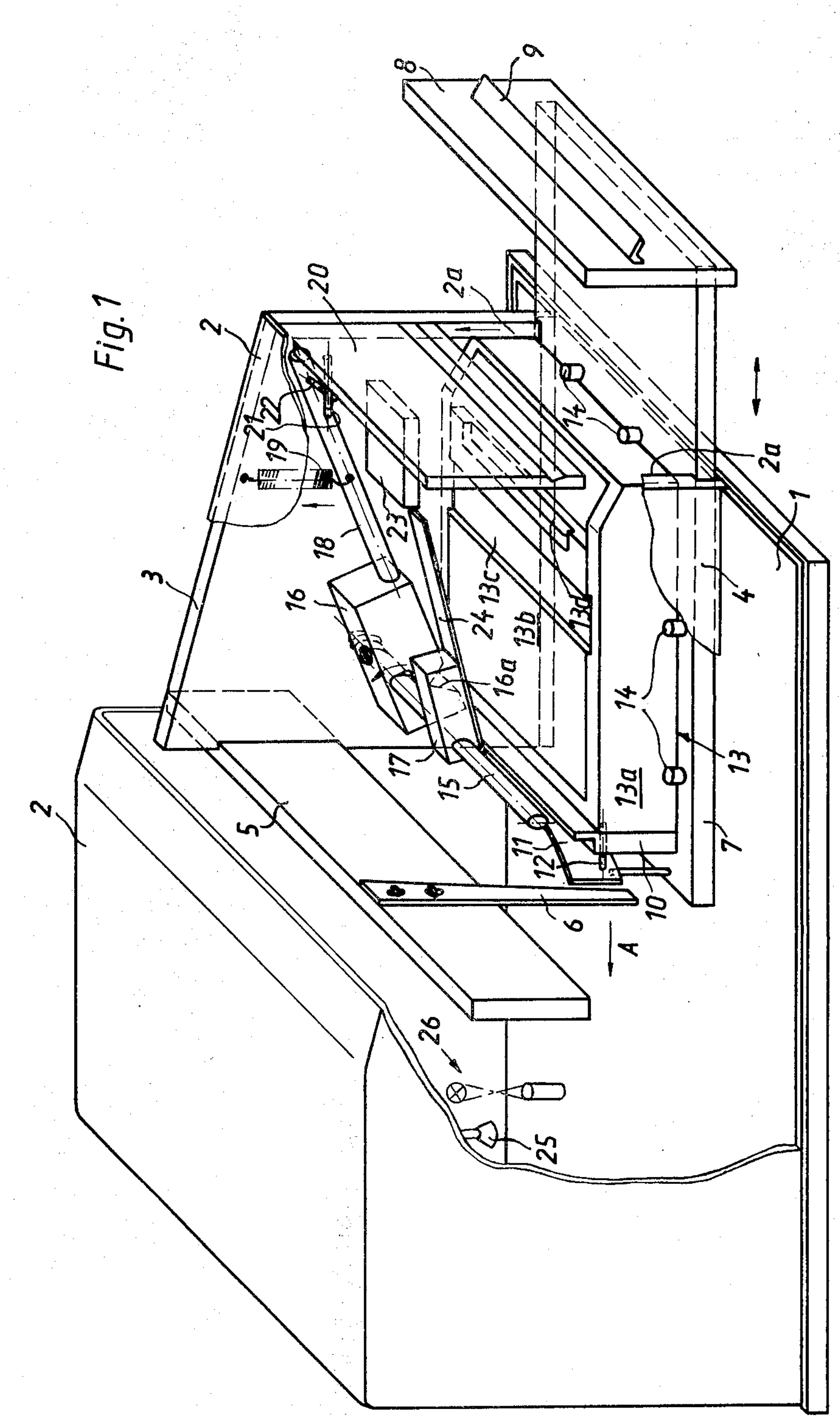
FIG. 1 is a perspective view of the arrangement of the present invention, wherein a cassette is partially introduced into the same.

Referring now to the drawing in detail, and first to FIG. 1, it may be seen that reference numeral 1 has been used to designate a feeding table which is covered by a hood-shaped member 2 and bounds a withdrawing station therewith. Two parallel guiding plates 3 and 4 are mounted on the feeding table 1, these plates 3 and 4 extending parallel to one another and to the intended direction of movement of a respective cassette 13. For the sake of clarity, only a small portion of the guiding plate 4 has been shown in the drawing. A transverse member 5 extends between the guiding plates 3 and 4. A downwardly extending abutment 6 is affixed to the transverse member 5.

A movable carriage 7 is slidingly mounted between the guiding plates 3 and 4. The carriage 7 is provided, at its free end, with a sealing plate 8 that is formed with a handgrip 9. The dimensions of the sealing plate 8 are so selected that it covers an inlet opening 2*a* provided in the hood-shaped member 2. The opening 2*a* has not been illustrated as to its exact dimensions, but it is to be understood that the opening 2*a* has such dimensions as to permit passage therethrough of all possible types of cassettes 13 which are contemplated to be introduced therethrough. Of course, the sealing plate 8 seals the opening 2*a* only when the carriage 7 assumes its fully introduced position; otherwise, a space would is present between the sealing plate 7 and the opening 2*a*, through which ambient light can reach inlet opening 2*a*.

A cassette abutment 10 is provided at the end of the carriage 7 which is remote from the sealing plate 8. A spring 11, preferably a leaf spring or a spring of a synthetic plastic material, which carries a pin 12, is disconnectably mounted on the cassette abutment 10. The pin 12 passes through a non-illustrated bore in the cassette abutment 10 and cooperates with a latching mechanism of the respective cassette 13 in a manner which will be more fully discussed later on. In addition thereto, there are mounted on the carriage 7 several delimiting pins 14 which can be arranged at different locations of the carriage 7, preferably by being partially accommodated in corresponding bores. The delimiting pins 14 are so distributed relative to one another as to confine the respective cassette 13 between themselves and to prevent any substantial horizontal movements of the cassette 13 relative to the carriage 7. It will be appreciated that the distribution pattern of the delimiting pins 14 will differ from one type of the cassette 13 to another.

The cassettes 13, generally speaking, are of special constructions. Each cassette 13 includes a cassette body 13*a*, and a cassette lid 13*b* which is guided at the upper side of the cassette 13 in respective channels for movement in and opposite to the direction of insertion of the cassette 13. The cassette lid 13*b* is formed, at its upper side, with a transverse groove 13*c*, as well as with a depression 13*d* provided at the edge of the lid 13*b* which faces the sealing plate 8 of the carriage 7. A bore which is aligned with the pin 12 is provided in the cassette body 13*a*. A known latching mechanism for the lid 13*b* is accommodated in, or in register with, this bore. This latching mechanism prevents the opening of the cassette lid 13*b* until the pin 12 unlatches this latching mechanism and thus frees the lid 13*b* for movement toward its open position.

Furthermore, a shaft 15 is arranged between the guiding plates 3 and 4. An engaging element 16 and a support member 17 are mounted on the shaft 15 for positional adjustment relative thereto and for joint rotation therewith. The engaging member 16 is formed with a wedge-shaped engaging portion 16*a* which so cooperates with the cassette 13 or with the carriage 7 that the engaging member 16, and thus the shaft 15, is turned in the clockwise direction as considered in FIG. 1 during the introduction of the cassette 13 into the withdrawing station. A rod 18 is mounted on the engaging member 16 and is connected, by means of a tension spring 19, with the guiding plate 3. The tension spring 19 biases the engaging member 16 into its rest position illustrated in FIG. 1.

A light-intercepting closure 20 is arranged in the interior of the hood-shaped member 2. The closure 20 is mounted in corresponding grooves of the guiding plates 3 and 4 for vertical displacement. The light-intercepting closure 20 has such a height that, in its lower or extended position, it light-tightly closes the inlet opening 2*a* which is provided in the hood 2. An inwardly extending pin 21 is provided at the upper end of the light-intercepting closure 20. The pin 21 freely rests on another pin 22 which is affixed to the free end of the rod 18 and extends substantially transversely of the pin 21. In addition thereto, an inwardly extending blocking member 23 is mounted on the light-intercepting closure 20.

A lid-opening member 24 is mounted on the support member 17 for joint pivoting therewith. In the terminal pivoted position of the shaft 15, the lid-opening member 24 engages in the groove 13*c* of the lid 13*b*.

Figure 2:
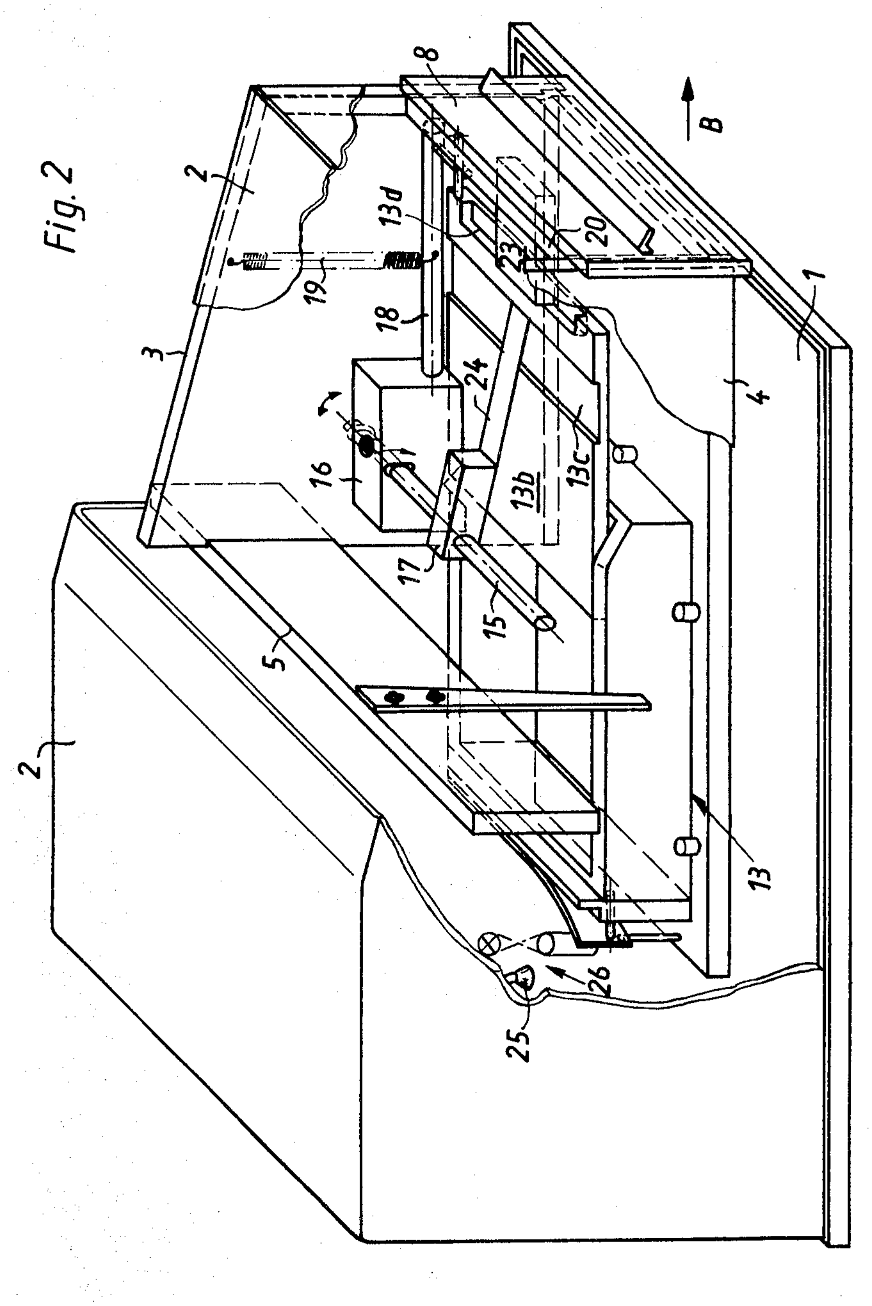
FIG. 2 is a view similar to FIG. 1 but with the cassette being in its fully inserted position.

Having so discussed the construction of the arrangement of the present invention based on FIG. 1, the operation of the arrangement will now be discussed with reference to FIGS. 1 and 2.

At the beginning of the operation of the arrangement of the present invention, the closed cassette 13 is positioned on the carriage 7 and confined by the delimiting pins 14 in a position in which it abuts the cassette abutment 10. Thereafter, the operator grips the sealing plate 8, preferably at its handgrip 9, of the carriage 7 and displaces the same in the direction toward a withdrawing station 25, that is, in the direction of the arrow A. During this movement, the cassette 13 or cassette abutment 10 first engages the wedge-shaped engaging portion 16*a* of the engaging member 16 and pivots the same in the clockwise direction during the further inserting movement thereof. At this time, the rod 18 is moved in the clockwise direction, that is, downwardly, against the force of the spring 19, so that the pin 22 which is mounted at the free end of the rod 18 permits the pin 21 connected to the closure 20 to move downwardly, so that the light-intercepting closure 20 is lowered until it contacts the bottom of the carriage 7. As soon as, or shortly after, the light-intercepting closure 20 has contacted the bottom of the carriage 7 and thus light-tightly closed the inlet opening 2*a*, the spring 11 abuts the abutment 6, as a result of which the pin 12 is pressed into the opening of the cassette body 13*a* during the further movement of the carriage 7, and the latching mechanism of the cassette 13 is unlatched.

At this time, the lid-opening member 24 is introduced, as a result of the turning of the shaft 15, into the transverse groove 13*c* of the cassette 13 so that, during the further introduction of the carriage 7, the lid 13*a* is retained by the lid-oepning member 24 and thus displaced toward its open position relative to the cassette body 13*a*. During this further movement of the carriage 7, the cassette 13 reaches the position illustrated in FIG. 2, in which the carriage 7 also reaches its fully introduced position, the light-intercepting closure 20 is closed, and the shaft 15 assumes its terminal pivoted position. At this time, that end of the cassette 13 which is adjacent to the cassette abutment 10 of the carriage 7 is located in the withdrawing station in which the individual sheets can be withdrawn from the cassette 13, for instance, by means of suction-type lifting arrangements of conventional construction which have only been indicated in the drawing. The withdrawing station also includes a detecting device 26, such as a light-detector, which generates an optical or acoustic signal as soon as the contents of the respective cassette 13 has been withdrawn, that is, after the withdrawing station 25 ceases to transfer the sheets. Inasmuch as the cessation of withdrawal can be accidental, this signal is not issued until after the withdrawing station has operated twice or three times without transferring any sheets. The construction and operation of the detecting means 26 is fully conventional so that no details thereof need be disclosed here.

In accordance with the invention, it is significant whether or not one or more sheets are still accommodated in the cassette 13 after the issuance of the signal, inasmuch as the carriage 7 can be retracted at any time without exposing the possibly present sheets to ambient light. Thus, the cassete 13 can be removed from the carriage 7 after its retraction and examined for possible presence of non-withdrawn sheets therein. This is rendered possible by the fact that, when the carriage 7 is retracted from the withdrawing station in the direction of the arrow B, the lid 13*b* is initially retained by the blocking member 23, so that the cassette body 13*a* is shifted underneath the lid 13*b*, until the latching mechanism of the cassette 13 latches the lid 13*b* in its closed position. When this happens, the cassette abutment 10 or the end of the cassette 13 which is adjacent thereto has reached the engaging member 16, so that the latter is freed and the spring 19 pivots the rod 18 back, in the counterclockwise direction. As a result of the counterclockwise pivoting of the rod 18, the pin 22 lifts the pin 21 and with the latter also the light-intercepting closure 20 into its retracted position, so that the now closed cassette 13 supported on the carriage 7 can be retracted from the interior of the hood 2 through the inlet opening 2*a*. During this return movement of the carriage 7, the spring 11 passes by the abutment 6 without being actuated thereby.

The arrangement according to the present invention can be fitted, in a relatively simple manner, to cassettes 13 of different types which have different dimensions, as a result of the various possibilities of arrangement of the delimiting pins 14, the spring 11, the engaging member 16, and the support member 17.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

We claim:

1. An arrangement for presenting sheets of light-sensitive material which are accommodated in light-tight containers having lids movable between closed and open positions, to a sheet-treating device having an inlet opening, comprising a closure mounted on the device for displacement between an extended position in which it light-tightly closes the inlet opening and a retracted position in which it is removed from the latter; means for displacing said closure from said retracted into said extended position in response to movement of a respective container completely through the inlet opening into the device in one direction and in an initial path section; and means for moving the lid of the container into the open position in response to further movement of the container in said one direction in a terminal path section.

2. An arrangement as defined in claim 1, further comprising means for supporting the respective container for movement into the device through the inlet opening, including a carriage to which the respective container is connected in an assembled position to form a movable unit therewith; and wherein said displacing and said moving means include engaging means engaging said movable unit during the movement of the latter in the respective path sections for activating said displacing and moving means.

3. An arrangement as defined in claim 2, wherein said engaging means is so arranged relative to said movable unit and so cooperates with said displacing and moving means that said moving means is activated only after said displacing means has displaced said closure into said extended position.

4. An arrangement as defined in claim 3, wherein said engaging means includes at least one engaging element mounted on the device for pivoting about an axis into and out of the path of movement of said movable unit; and wherein said displacing means includes a displacing element connected to said engaging element for joint pivoting about said axis and to said closure for joint displacement.

5. An arrangement as defined in claim 2 for use with containers constructed as cassettes the lids of which are opened by shifting the same opposite to said one direction, wherein said moving means includes arresting means which arrests the lid of the respective cassette while said cassette moves in said one direction in said terminal path section.

6. An arrangement as defined in claim 5, wherein said engaging means includes at least one engaging element mounted on the device for pivoting about an axis into and out of the path of movement of said movable unit; and wherein said arresting means includes an arresting element connected to said engaging element for joint pivoting about said axis.

7. An arrangement as defined in claim 2; wherein said carriage has an exposed end portion extending to the exterior of the device, and a sealing plate mounted on said end portion and covering said closure and the inlet opening when said container reaches the terminal end of said terminal path section.

8. An arrangement as defined in claim 1 for use with containers the lids of which are latched in their closed positions, further comprising means for unlatching the lid of the respective container in response to movement of the latter in said one direction in an intermediate path section situated between said initial and terminal path sections.

9. An arrangement as defined in claim 8, wherein said moving and said unlatching means are so arranged with respect to one another and said container that said moving means becomes active only after said unlatching means has unlatched the lid of the respective container.

10. An arrangement as defined in claim 8, wherein said unlatching means includes a resilient element mounted for joint movement with the respective container, a pin mounted on said resilient element and aligned in said one direction with an aperture in the container which opens onto lid-latching means of the container, and an abutment stationarily mounted in the device and extending into the trajectory of movement of said resilient element to introduce said pin into said aperture and to unlatch the lid-latching means as said container moves in said one direction in said intermediate path section.

11. An arrangement as defined in claim 1; and further comprising means for returning said lid into said closed position during the movement of said container opposite to said one direction prior to reaching said initial path section.

12. An arrangement as defined in claim 11, wherein said returning means includes a blocking element engaging the lid of the respective container while said closure assumes said extended position thereof.

13. An arrangement as defined in claim 12, wherein said blocking element is connected to said closure for joint displacement therewith.

14. An arrangement as defined in claim 1, and further comprising means in the device for withdrawing the sheets from the container.

15. An arrangement as defined in claim 14, wherein said withdrawing means includes suction means.

* * * * *